J. T. HAY.
JOURNAL BOX.
APPLICATION FILED APR. 11, 1913.

1,110,388.

Patented Sept. 15, 1914.

WITNESSES,
L. B. Werner.
I. L. Larson.

INVENTOR.
John T. Hay,
By Minturn & Werner,
Attorneys.

UNITED STATES PATENT OFFICE.

JOHN T. HAY, OF UNION CITY, INDIANA.

JOURNAL-BOX.

1,110,388. Specification of Letters Patent. Patented Sept. 15, 1914.

Application filed April 11, 1913. Serial No. 760,482.

*To all whom it may concern:*

Be it known that I, JOHN T. HAY, a citizen of the United States, residing at Union City, in the county of Randolph and State of Indiana, have invented certain new and useful Improvements in Journal-Boxes, of which the following is a specification.

This invention relates to improvements in journal boxes for the shafts or pins of connecting rods, pitmen, and the like, and the object is to provide journal boxes in a plurality of parts of such a shape that the wearing surfaces will automatically maintain a good bearing fit against the pin or shaft journaled in them, thus obviating the necessity of removal for refitting.

The object also is to provide a journal box in which the customary joint between the two box members, permitting the escape of lubricating oil, will be modified, and to provide means in conjunction with this modified construction to retain the lubricant within the limits of the bearing surfaces of the journal.

The further object is to simplify and cheapen the construction of journal boxes without detracting from their utility.

I accomplish the objects of my invention by the mechanism illustrated in the accompanying drawing, in which—

Figure 1:
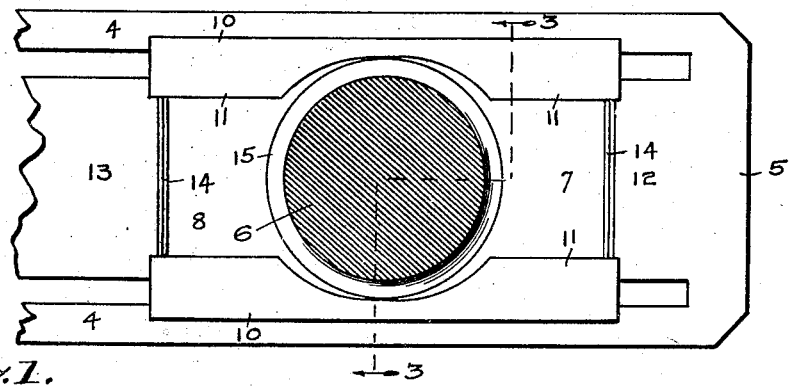
Figure 2:
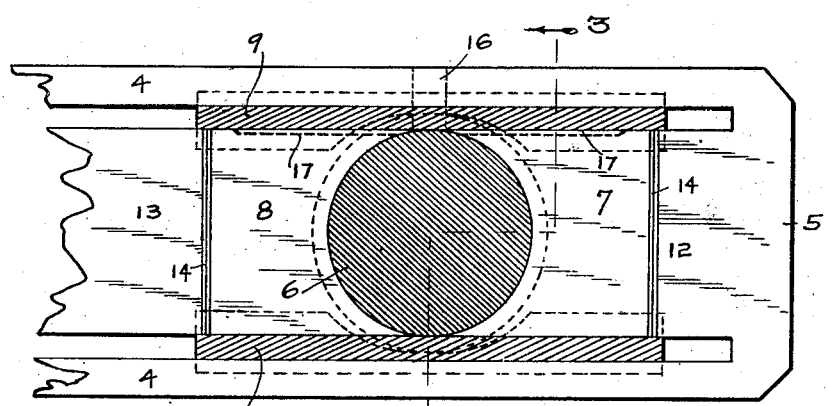
Figure 3:
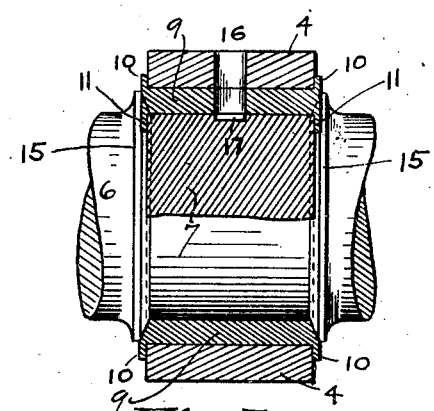

Figure 1 is a view in side elevation of an end of a connecting rod containing my improvements, the crank pin being shown in cross section. Fig. 2 is a view in vertical section longitudinally of the connecting rod through the flanged plates and flanged crank pin cutting off the flanges to expose the underlying parts, and Fig. 3 is a cross section on the line 3—3 of Figs. 1 and 2.

Like characters of reference indicate like parts throughout the several views of the drawing.

4 are the stems of a yoke secured to or forming part of the body of a connecting rod or pitman, and 5 is a crossbar connecting the two stems. 6 is a crank pin passing between the stems 4 of the yoke. 7 is the outer bearing brass member and 8 is the inner bearing brass member, the vertical dimensions of which are equal to the diameter of the pin 6 so that the planes of the upper and lower ends of these brass members are tangent to the periphery of the pin, as clearly shown in Fig. 2.

9 are filling plates between the pin 6 and the bearing brasses 7 and 8, and the stems 4 of the yoke. They have flanges 10 which overlap the stems 9 and the flanges 11 which overlap the bearing brasses 7 and 8, thus holding the brasses in their proper positions relative to the stems 4. Blocks 12 and 13 enter between the flanges 11 and prevent the outward displacement of the bearing brasses 7 and 8 from the pin 6. Shims 14 may be used if required between the blocks 12 and 13 and the bearing brasses 7 and 8 to take up any looseness due to wear or other causes.

The bearing brasses 7 and 8 fit between annular flanges 15 on the pin 6, and these flanges have beveled inner faces, as shown in Fig. 3, to bear against corresponding faces of the bearing brasses 7 and 8 so as to make an oil tight fit between the bearing brasses and the flanges of the shaft or pin to prevent the escape and waste of lubricating oil at those joints. A suitable opening 16 is provided through the top stem 4 and upper filling plate 9 for the introduction of the lubricating oil into an oil cavity 17 in the top of the bearing brasses.

While I have described my invention with more or less minuteness as regards details of construction and arrangement and as being embodied in certain precise forms, I do not desire to be limited thereto unduly or any more than is pointed out in the claims. On the contrary, I contemplate all proper changes in form, construction and arrangement, the omission of immaterial elements and the substitution of equivalents, as circumstances may suggest or necessity render expedient.

I claim:

1. In a journal box for rotary shafts, a pair of bearing brasses each having two sides which are substantially tangent to the cylindrical bearing surface of the shaft, all of said sides being in parallel planes, shims contacting the bearing brasses a connecting-rod frame within which the boxes are mounted filling plates between the bearing brasses and shaft and the frame, said filling plates having flanges to overlap the frame and flanges to overlap the brasses and shims.

2. A journal box for a rotary shaft said shaft having a pair of annular flanges to receive bearing brasses between them, in combination with a pair of bearing brasses each having two sides which are substantially tangent to the cylindrical bearing surface of the shaft, all of said sides being in parallel planes, oil cavities in a plurality of said sides, a connecting-rod frame within which the boxes are mounted and filling-plates between the bearing brasses and frame, said plates having flanges to overlap the brasses and frame and an oil hole through the upper frame member and upper filling-plate into the oil cavities in the bearing brasses.

In witness whereof, I have hereunto set my hand and seal at Union City, Indiana, this 3d day of April, A. D. one thousand nine hundred and thirteen.

JOHN T. HAY. [L. S.]

Witnesses:
J. A. SHOCKNEY,
ALMA WARE.

Copies of this patent may be obtained for five cents each, by addressing the "Commissioner of Patents, Washington, D. C."